US008934398B2

(12) United States Patent
Gaal et al.

(10) Patent No.: US 8,934,398 B2
(45) Date of Patent: Jan. 13, 2015

(54) SYSTEM, APPARATUS, AND METHOD FOR REPEATER PILOT SIGNAL GENERATION IN WIRELESS COMMUNICATION SYSTEMS

(75) Inventors: Peter Gaal, San Diego, CA (US); Ravi Palanki, San Diego, CA (US); Yongbin Wei, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 372 days.

(21) Appl. No.: 13/269,354

(22) Filed: Oct. 7, 2011

(65) Prior Publication Data

US 2013/0089021 A1    Apr. 11, 2013

(51) Int. Cl.
*H04B 7/155* (2006.01)

(52) U.S. Cl.
CPC ...................................... *H04B 7/155* (2013.01)
USPC ........................................................ 370/315

(58) Field of Classification Search
CPC .............. H04B 7/155; H04B 7/15585; H04B 7/15564; H04B 7/15507; H04B 7/14; H04B 7/15
USPC ................. 370/274, 279, 315–327, 492, 501; 455/7–25, 126; 375/211, 214
See application file for complete search history.

(56) References Cited

U.S. PATENT DOCUMENTS

| | | | |
|---|---|---|---|
| 6,385,435 B1 | 5/2002 | Lee | |
| 6,745,018 B1 | 6/2004 | Zehavi et al. | |
| 7,139,580 B2 | 11/2006 | Stein et al. | |
| 7,280,467 B2* | 10/2007 | Smee et al. | 370/208 |
| 7,573,807 B1* | 8/2009 | Riazi et al. | 370/210 |
| 8,073,385 B2* | 12/2011 | Braithwaite et al. | 455/9 |
| 8,135,339 B2* | 3/2012 | Ranson et al. | 455/24 |
| 8,224,242 B2* | 7/2012 | Chang | 455/39 |
| 2005/0026561 A1* | 2/2005 | Shklarsky et al. | 455/11.1 |
| 2008/0242226 A1 | 10/2008 | Ma et al. | |
| 2009/0291632 A1 | 11/2009 | Braithwaite et al. | |
| 2010/0284280 A1 | 11/2010 | Gore et al. | |
| 2010/0284445 A1* | 11/2010 | Barriac et al. | 375/211 |
| 2010/0285734 A1 | 11/2010 | Black et al. | |
| 2011/0103296 A1* | 5/2011 | Ji et al. | 370/315 |
| 2011/0228728 A1* | 9/2011 | Baligh et al. | 370/328 |
| 2012/0320880 A1* | 12/2012 | Han et al. | 370/335 |
| 2013/0003641 A1* | 1/2013 | Nakano et al. | 370/312 |

FOREIGN PATENT DOCUMENTS

WO    2009061084    5/2009

OTHER PUBLICATIONS

Proakis and Salehi, "Communications Systems Engineering 2$^{nd}$ Edition", 2002, Prentice Hall, pp. 36, 37 and 42.*
Agilent Technologies, "3GPP Long Term Evolution: System Overview, Product Development, and Test Challenges," Jul. 10, 2008, EE Times.*
International Search Report and Written Opinion—PCT/US2012/058262—ISA/EPO—Dec. 14, 2012.

* cited by examiner

*Primary Examiner* — Mark Rinehart
*Assistant Examiner* — Kenneth P Hunt
(74) *Attorney, Agent, or Firm* — Muncy, Geissler, Olds & Lowe, P.C.

(57) ABSTRACT

In accordance with aspects of the disclosure, a method, apparatus, and computer program product for wireless communication comprises receiving a remote signal via a donor antenna of a repeater, generating an amplified signal by amplifying the received remote signal, generating an auxiliary pilot signal by a translation of the amplified signal for estimating channel feedback, wherein the auxiliary pilot signal is substantially uncorrelated to the amplified signal, and generating a transmit signal for transmitting by combining the auxiliary pilot signal with the amplified signal.

76 Claims, 7 Drawing Sheets

SYSTEM, APPARATUS, AND METHOD FOR REPEATER PILOT SIGNAL GENERATION IN WIRELESS COMMUNICATION SYSTEMS

BACKGROUND

1. Field

The disclosure relates generally to communication systems, and more particularly, to systems and methods for facilitating repeater pilot signal generation in a wireless communications systems.

2. Background

Wireless communication systems are widely deployed to provide various telecommunication services, such as telephony, video, data, messaging, and broadcasts. Some conventional wireless communication systems may use multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and worldwide interoperability for microwave access (WiMAX).

For wireless communication systems, multiple-access technologies are utilized in various telecommunication standards to provide a common protocol that enables different wireless devices to communicate on a municipal, national, regional, and global level. These wireless multiple-access communication systems may simultaneously support communication for multiple wireless terminals. Each terminal communicates with one or more base stations via signal transmissions on a forward link and a reverse link. The forward link or downlink (DL) refers to a communication link from the base stations to the terminals, and the reverse link or uplink (UL) refers to a communication link from the terminals to the base stations. Communication links may be established via a single-in-single-out, multiple-in-signal-out, or a multiple-in-multiple-out (MIMO) system.

Generally, Universal Mobile Telecommunications System (UMTS) is a third-generation (3G) cell phone technology. UTRAN (UMTS Terrestrial Radio Access Network) is a term for referring to Node B and Radio Network Controllers (RNCs) in a UMTS radio access network that may carry many different traffic types from real-time Circuit Switched (CS) to Internet Protocol (IP) based Packet Switched (PS). UTRAN provides connectivity between a UE (User Equipment) and a core network. UTRAN comprises base stations, which may be referred to as Node B devices and/or RNC devices. The RNC devices provide control functionalities for one or more Node B devices. The Node B and the RNC may be the same device, although typical implementations have a separate RNC located in a central office serving multiple Node B devices. The RNC and its corresponding Node Bs may be referred to as the Radio Network Subsystem (RNS). There may be more than one RNS present in a UTRAN.

An example of an emerging telecommunication standard is Long Term Evolution (LTE). The LTE system is described in the Evolved UTRA (EUTRA) and Evolved UTRAN (EUTRAN) series of specifications. LTE provides a set of enhancements to the UMTS mobile standard promulgated by 3GPP. LTE is designed to better support mobile broadband Internet access by improving spectral efficiency, lower costs, improve services, make use of new spectrum, and better integrate with other open standards utilizing OFDMA on the downlink (DL), SC-FDMA on the uplink (UL), and multiple-input multiple-output (MIMO) antenna technology.

However, as the demand for mobile broadband access continues to increase, there exists a need for further improvements in LTE technology. Preferably, these improvements should be applicable to other multi-access technologies and the telecommunication standards that employ these technologies.

SUMMARY

In accordance with aspects of the disclosure, a method for wireless communication comprises receiving a remote signal via a donor antenna of a repeater, generating an amplified signal by amplifying the received remote signal, generating an auxiliary pilot signal by a translation of the amplified signal for estimating channel feedback, wherein the auxiliary pilot signal is substantially uncorrelated to the amplified signal, and generating a transmit signal for transmitting by combining the auxiliary pilot signal with the amplified signal.

In accordance with aspects of the disclosure, an apparatus for wireless communication comprises a processing system configured to receive a remote signal via a donor antenna of a repeater, generate an amplified signal by amplifying the received remote signal, generate an auxiliary pilot signal by a translation of the amplified signal for estimating channel feedback, wherein the auxiliary pilot signal is substantially uncorrelated to the amplified signal, and generate a transmit signal for transmitting by combining the auxiliary pilot signal with the amplified signal.

In accordance with aspects of the disclosure, an apparatus for wireless communication comprises means for receiving a remote signal via a donor antenna of a repeater, means for generating an amplified signal by amplifying the received remote signal, means for generating an auxiliary pilot signal by a translation of the amplified signal for estimating channel feedback, wherein the auxiliary pilot signal is substantially uncorrelated to the amplified signal, and means for generating a transmit signal for transmitting by combining the auxiliary pilot signal with the amplified signal.

In accordance with aspects of the disclosure, a computer program product comprises a computer-readable medium comprising codes executable to cause an apparatus to receive a remote signal via a donor antenna of a repeater, generate an amplified signal by amplifying the received remote signal, generate an auxiliary pilot signal by a translation of the amplified signal for estimating channel feedback, wherein the auxiliary pilot signal is substantially uncorrelated to the amplified signal, and generate a transmit signal for transmitting by combining the auxiliary pilot signal with the amplified signal.

DETAILED DESCRIPTION

Figure 1A:
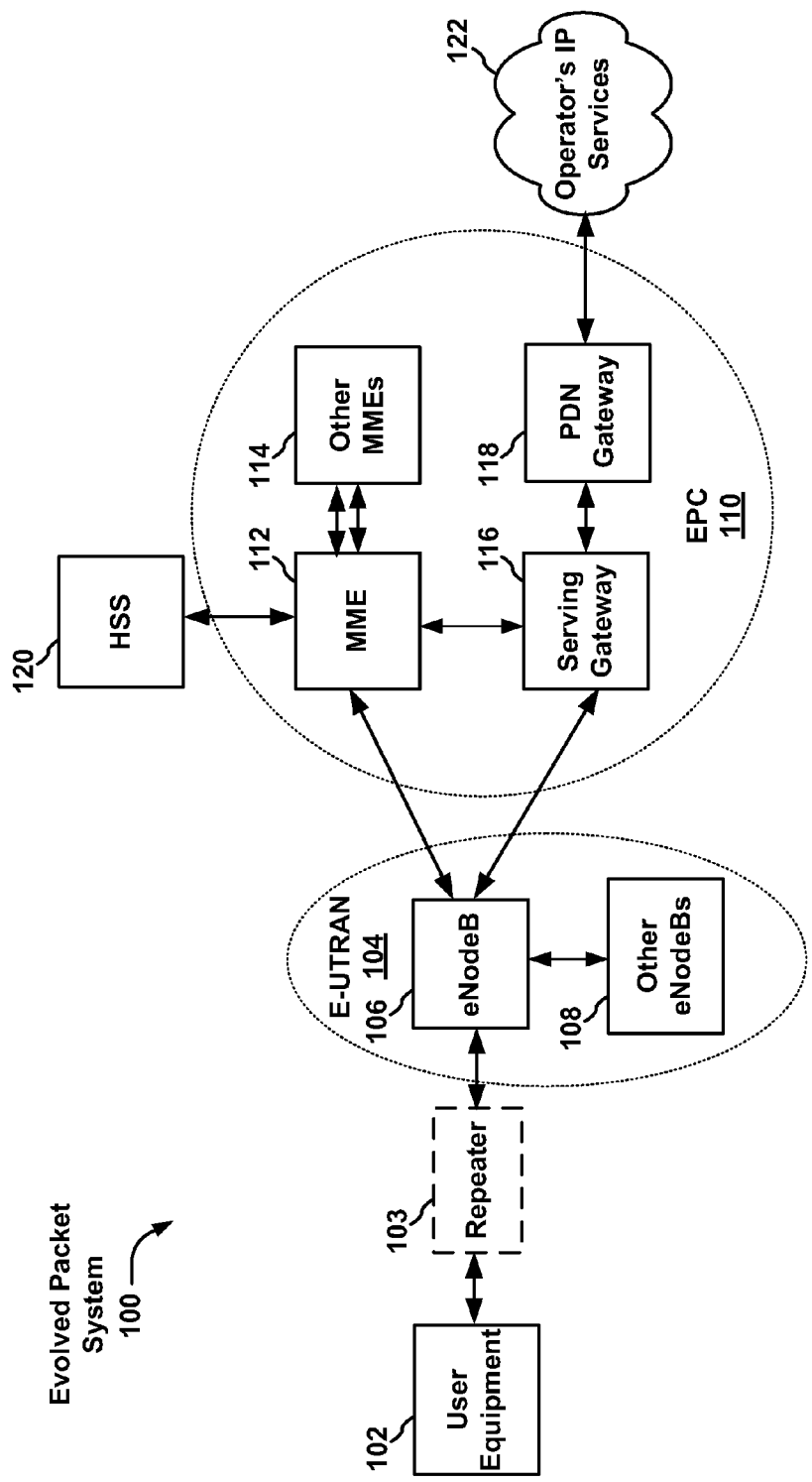
FIG. 1A shows a diagram illustrating an embodiment of a network architecture, in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in diagram form to avoid obscuring such concepts.

Several aspects of telecommunication systems are presented herein with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented utilizing electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. In accordance with aspects of the disclosure, the computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The techniques described herein may be utilized for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often utilized interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is utilized in much of the description below.

In accordance with aspects of the disclosure, single carrier frequency division multiple access (SC-FDMA) is a technique utilizing single carrier modulation and frequency domain equalization. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In accordance with aspects of the disclosure, a wireless multiple-access communication system is configured to simultaneously support communication for multiple wireless terminals. Each terminal communicates with one or more base stations via transmissions on the forward and reverse links. The forward link or downlink (DL) refers to the communication link from the base stations to the terminals, and the reverse link or uplink (UL) refers to the communication link from the terminals to the base stations. This communication link may be established via a single-in-single-out system, a multiple-in-single-out system, or a multiple-in-multiple-out (MIMO) system.

In accordance with aspects of the disclosure, a MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

In accordance with aspects of the disclosure, a MIMO system supports a time division duplex (TDD) and frequency division duplex (FDD) systems. For instance, in a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Various aspects of the disclosure are described herein in connection with a mobile device. In some aspects, the mobile device may also be referred to as a system, a subscriber unit, a subscriber station, mobile station, mobile, mobile device, cellular device, multi-mode device, remote station, remote terminal, access terminal, user terminal, user agent, a user device, or user equipment, or the like. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Various aspects of the disclosure are described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are shown in diagram form to facilitate describing these aspects.

FIG. 1A shows a diagram illustrating a network architecture 100 employing various apparatuses, in accordance with aspects of the disclosure. In an implementation, the network architecture 100 may comprise an LTE network architecture and may be referred to as an Evolved Packet System (EPS) 100. The EPS 100 comprises one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS 100 may be configured to interconnect with other access networks, but for simplicity those entities/interfaces are not shown. Referring to FIG. 1A, the EPS is configured to provide packet-switched (PS) services. However, as those skilled in the art will readily appreciate, the various concepts presented throughout this disclosure may be extended to networks providing circuit-switched (CS) services.

In an implementation, the EPS 100 may include a repeater 103 to achieve coverage extension. The use of one or more repeaters, such as the repeater 103, may increase in the context of personal or residential coverage extension. In an example, the repeater 103 may comprise a physical layer device, operable to amplify received signals, including usable signals as well as noise and interference, as the repeater 103 may not decode data. The repeater 103 state may not be communicated to either the eNodeB 106 of the E-UTRAN 104 or the UE 102. In one operational implementation, where the repeater 103 is at its maximum output power but the UE 102 output power is not at a maximum, then any UE 102 power increases may result in saturating the repeater 103. In another operational implementation, a repeated signal received at the E-UTRAN 104 may not to be decodable and may cause the E-UTRAN 104 to request the UE 102 to raise its power.

In some implementations, repeater performance may be bounded by or dependent on one or more parameters, such as, for example, a maximum amplification (gain) and a maximum output power. The repeater may be operable to use dynamic gain control and may adjust signal amplification to maximize gain given the above parametric constraints. Determining an amplification factor may take time and thus may be based on receive power before the time the amplification is applied, and the gain may be adapted to control self-interference impacts.

In an implementation, the E-UTRAN 104 includes the evolved Node B (eNodeB) 106 and other eNodeBs 108. The eNodeB 106 provides user and control plane protocol terminations toward the UE 102. The eNodeB 106 may be connected to the other eNodeBs 108 via an X2 interface (i.e., backhaul). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring to FIG. 1A, the eNodeB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 include the Internet, the Intranet, an IP Multimedia Subsystem (IMS), and a PS Streaming Service (PSS).

Figure 1B:
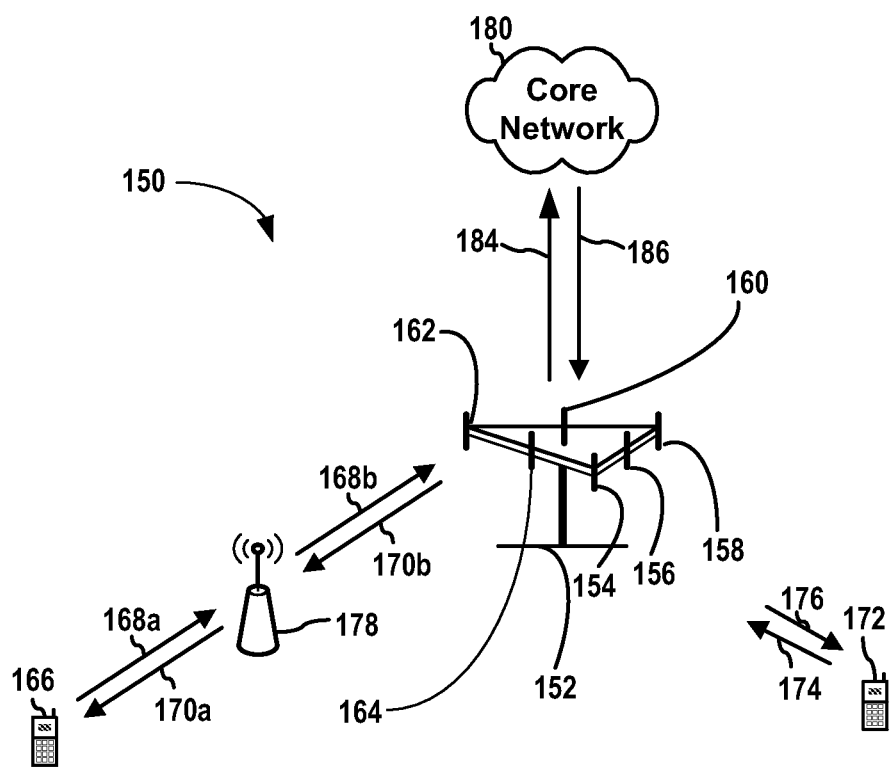
FIG. 1B shows a diagram illustrating an embodiment of a wireless communication system, in accordance with aspects of the disclosure.

FIG. 1B shows a diagram illustrating an embodiment of a wireless communication system 150, in accordance with aspects of the disclosure. In an implementation, the wireless communication system 150 comprises a multiple access wireless communication system. The wireless communication system 150 may comprise one or more UE devices 166, 172, at least one repeater (R) device 178, at least one base station device (BS) 152, and at least one core network (CN) 180.

Figure 2:
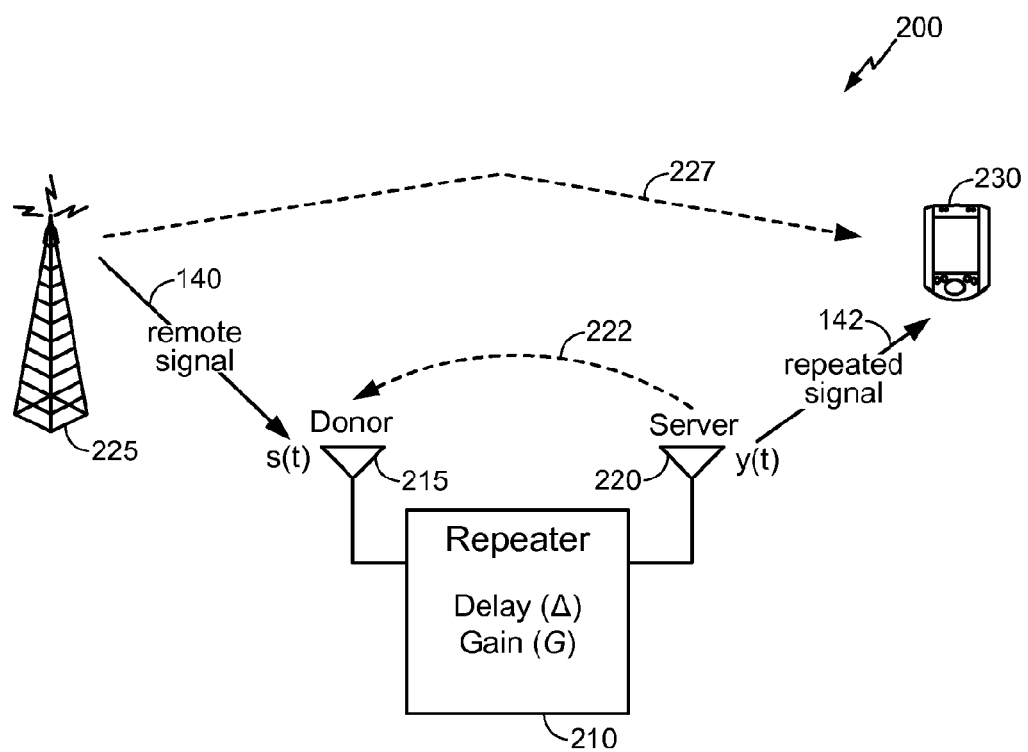
FIG. 2 shows a diagram illustrating an environment for a repeater, in accordance with aspects of the disclosure.

The BS 152 comprises, in an implementation, an access point (AP) comprising multiple antenna groups, for example, one antenna group including antennas 154, 156, another antenna group including antennas 158, 160, and another antenna group including antennas 162, 164. Referring to FIG. 2, even though two antennas are shown for each antenna group, more or fewer antennas may be utilized for each antenna group without departing from the scope of the disclosure.

The UE 166 comprises, in an implementation, an access terminal (AT) that is in communication with any one of the antennas 162, 164, wherein at least one of the antennas 162, 164 transmit information to the access terminal 166 over forward link or downlink (DL) 170a, 170b via the repeater 178 and receive information from the UE 166 over reverse link or uplink (UL) 168a, 168b via the repeater 178. The repeater 178 comprises, in an implementation, a communication device configured to receive a signal, amplify the received signal, and transmit the amplified signal in a manner consistent with the functionality of a repeater.

The UE 172 comprises, in an implementation, an access terminal (AT) in communication with any one of the antennas 156, 158, wherein at least one of the antennas 156, 158 transmit information to the UE 172 over forward link or DL 176 and receive information from the UE 172 over reverse link or UL 174.

In an aspect of the disclosure, in a frequency division duplexing (FDD) system, communication links 168a, 168b, 170a, 170b, 174, and 176 may utilize different frequencies for communication. For instance, DL 170a, 170b may utilize a different frequency than that utilized by UL 168a, 168b.

In an aspect of the disclosure, each antenna group and/or the area in which they are configured to communicate may be referred to as a sector of the base station. In an example, each antenna group may be configured to communicate with any UE that is within a sector of the areas covered by the base station.

When communicating over forward links or DLs 170a, 170b, 176, the transmitting antennas of the BS 152 may utilize beamforming to improve a signal-to-noise ratio (SNR) of the forward links or DLs 170a, 170b, 176 for the different UEs 166, 172, respectively. For instance, a base station, such as the BS 152, utilizing beamforming to transmit to UEs, such as UEs 166, 172, scattered randomly through its coverage may cause less interference to the UEs in neighboring cells than a base station transmitting through a single antenna to all its UEs.

In various implementations, a base station may be a fixed station used for communicating with UE and may be referred to as an access point (AP), a Node B (NB), evolved Node B (eNodeB or eNB), or some other terminology. A UE may be referred to as an access terminal (AT), a wireless communication device, terminal, or some other terminology. Moreover, a base station may be a macrocell access point, femtocell access point, picocell access point, and/or the like. The repeater may be configured as a base station or user equipment.

In various embodiments, as described herein, one or more segments or one or more extension carriers may be linked to a regular carrier resulting in a composite bandwidth over which the user equipment may transmit information to and/or receive information from the base station.

In an aspect of the disclosure, the base station 152 is configured to communicate with the core network (CN) 180 via one or more communication paths, such as, for example, an uplink (UL) 184 and/or a downlink (DL) 186. The CN 180 may comprise part of a communication network that provides various services to users connected by the wireless communication system 150. The CN 180 may refer to communication facilities that provide various paths for exchange of information between various sub-networks via a mesh topology. The CN 180 may be referred to as a backbone network. The various concepts presented throughout this disclosure may be implemented across a broad variety of telecommunication systems, network architectures, and communication standards.

FIG. 2 shows a diagram illustrating an environment 200 for a repeater 210 having forward link or downlink (DL) transmissions; i.e., a remote signal 140 from a base station 225 (e.g., Node B (NB) or evolved Node B (eNB)) is intended for a mobile device 230 (e.g., User Equipment (UE)), in accordance with aspects of the disclosure. The repeater 210 may be utilized in environment 200 if an unrepeated signal along a path 227 between the base station 225 and the mobile device 230 may not provide sufficient signal strength for effective voice and/or data communications received at the mobile device 230. The repeater 210 with a gain (G) and a delay (Δ) may be configured to repeat the remote signal 140 received from the base station 225 on a donor antenna 215 to the mobile device 230 using a server antenna 220. The repeater 210 includes forward link or downlink (DL) circuitry for amplifying and transmitting signals received from the base station 225 to the mobile device 230 through the donor antenna 215 and the server antenna 220. The repeater 210 may also include reverse link or uplink (UL) circuitry for amplifying and transmitting signals from the mobile device 230 to the base station 225. At the repeater 210, the remote signal s(t) 140 is received as an input signal, and the remote signal s(t) 140 is repeated as a repeated or amplified signal y(t) 142.

In an aspect of the disclosure, the gain (G) of the repeater 210 may be limited by the isolation between the donor antenna 215 and the server antenna 220. If the gain (G) is significantly large, the repeater 210 may become unstable due to signal leakage, which refers to a phenomenon when a portion of the signal that is transmitted from one antenna (e.g., the server antenna 220) is received by the other antenna (e.g., the donor antenna 215), as shown by a feedback path 222. Without interference cancellation, the repeater 210 may amplify a feedback signal (i.e., leakage signal) as part of normal operation, and the amplified feedback signal may be transmitted by the server antenna 220. The repeated transmission of the amplified feedback signal due to signal leakage and high repeater gain may lead to repeater instability.

For the purposes of cancellation of self-interference in full duplex co-channel repeaters, an additional pilot signal (i.e., auxiliary pilot signal) may be added to the transmitted signal (i.e., amplified signal or repeated signal) to aid feedback channel estimation. In accordance with aspects of the disclosure, the auxiliary pilot signal may comprise one or more properties: the auxiliary pilot signal is known by the repeater, the auxiliary pilot signal has little or no time domain correlation with the signal being amplified, the auxiliary pilot signal has approximately the same bandwidth as the signal being amplified, and in case the signal being amplified has variable power spectral density, and/or the signal being amplified has multiple possible non-contiguous bandwidth clusters, the power spectral density of the auxiliary pilot signal should have a defined relationship to the power spectral density of the signal being amplified. For instance, the auxiliary pilot signal may have approximately the same power spectral density of the signal being amplified except for, in some circumstances, a linear scaling. Accordingly, aspects of the disclosure provide for use of a translated version or a transformed version of the signal to be amplified as an auxiliary pilot signal.

Figure 3A:
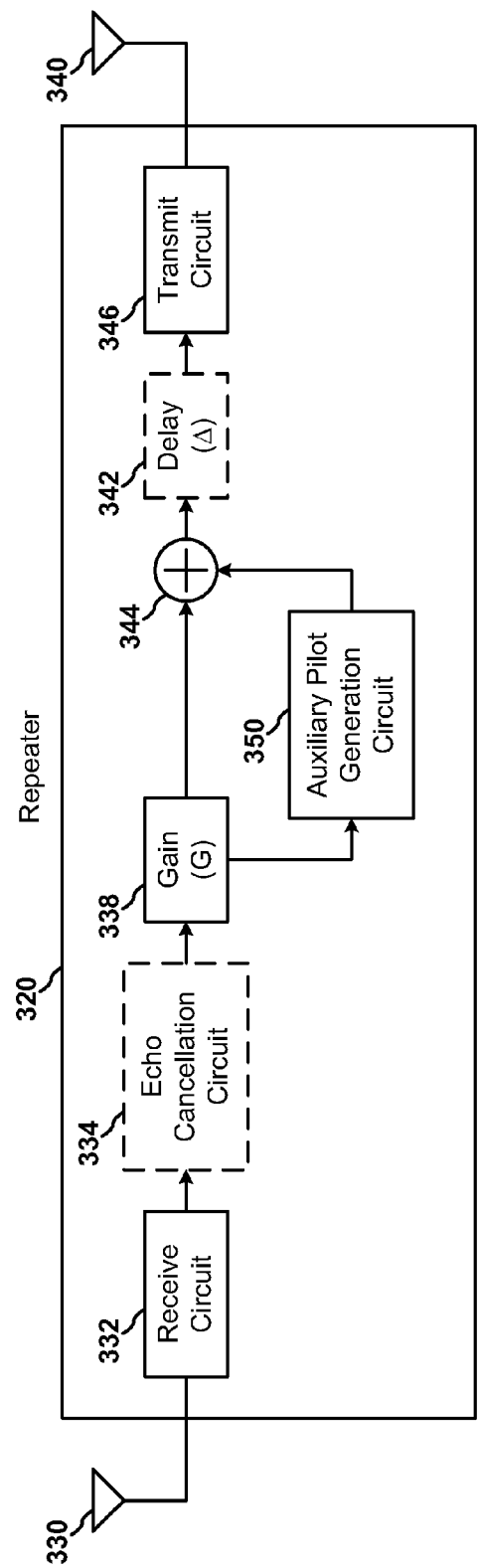
FIG. 3A shows a diagram illustrating a hardware implementation of an apparatus comprising a repeater for a wireless communication system, in accordance with aspects of the disclosure.

FIG. 3A shows a diagram illustrating a hardware implementation of an apparatus comprising a repeater 320 for a wireless communication system, in accordance with aspects of the disclosure. The repeater 320 is configured to receive a signal, amplify the received signal, and transmit the amplified signal. For instance, the repeater 320 receives a signal on a receive antenna 330 (e.g., such as a donor antenna, e.g., the donor antenna 215 of FIG. 2) through a receive circuit 332. In an implementation, the received signal comprises a remote signal (e.g., such as the remote signal 140) to be repeated and may include a feedback signal (e.g., such as the feedback signal) resulting from a feedback channel between the receive antenna 330 and a transmit antenna 340 (e.g., such as a server antenna, e.g., the server antenna 220 of FIG. 2) of the repeater 320. In the repeater 320, at least the remote signal component of the received signal is amplified by an amplifier 338 having a gain of G. The amplifier 338 is configured to generate an amplified signal to be transmitted from the repeater 320 via a transmit circuit 346 and the transmit antenna 340. The amplified signal may be delayed by a delay value ($\Delta$) via a delay circuit 342 prior to being transmitted. As shown in FIG. 3A, an adder 344 represents addition or combination of the amplified signal from the amplifier circuit 338 to an auxiliary pilot signal from an auxiliary pilot signal generation circuit 350. It should be appreciated that the adder 344 is illustrated symbolically, and in various implementations, appropriate circuitry may be utilized for adding or combining the auxiliary pilot signal with the amplified signal.

In an embodiment, the repeater 320 may be optionally implemented with or without echo cancellation via an echo cancellation circuit 334. When the repeater 320 comprises echo cancellation, an echo cancellation circuit 334 may be provided before the amplifier 338 to cancel undesirable feedback signals from the received signal. The repeater 320 may comprise other control circuitry, such as a channel estimation block for estimating the feedback channel and a gain control block for controlling the gain of the amplifier 338. These and various other control circuitry of the repeater 320 may not be shown in FIG. 3A to simplify the discussion. However, it should be understood that the repeater 320 may include one or more other elements and/or components to realize full repeater operation.

In the repeater 320, before the amplified signal is transmitted via the transmit antenna 340, a transmit message signal may be added to the amplified signal to enable repeater communication. The amplified signal and the transmit message signal may be combined and provided to the transmit circuit 346 to be transmitted via the transmit antenna 340. The transmit circuit 346 may include one or more filters and/or driver circuitry. The transmit message signal may comprise a low power spreading sequence and may comprise a power level much less than the power level of the amplified signal. The low power transmit message signal may be transmitted by the repeater 320 via the transmit circuit 346 and the transmit antenna 340.

In an aspect of the disclosure, as configured in FIG. 3A, a transmit signal is generated via the adder 344 and comprises a combination of the amplified signal and the auxiliary pilot signal, and the transmit signal is transmitted via the transmit circuit 346 over the transmit antenna 340. In an implementation, the auxiliary pilot signal generation circuit 350 is configured to generate the auxiliary pilot signal as a translation or transformation of the amplified signal. For purposes of cancellation of self-interference in full duplex co-channel repeaters, an additional pilot signal (i.e., auxiliary pilot signal) may be added to the transmitted signal (i.e., amplified signal or repeated signal) to aid feedback channel estimation.

In accordance with aspects of the disclosure, the auxiliary pilot signal generation circuit 350 may be configured to generate the auxiliary pilot signal with one or more desirable properties. For example, the auxiliary pilot signal is known by the repeater. In another example, the auxiliary pilot signal has little or no time domain correlation with the amplified signal. In another example, the auxiliary pilot signal has approximately the same bandwidth as the amplified signal. In still another example, in case the amplified signal has variable power spectral density, and/or the amplified signal has multiple possible non-contiguous bandwidth clusters, the power spectral density of the auxiliary pilot signal may have a defined relationship to the power spectral density of the amplified signal. For instance, the auxiliary pilot signal may have approximately the same power spectral density of the amplified signal except for, in some circumstances, a linear scaling. As such, aspects of the disclosure provide for use of a translated version or a transformed version of the amplified signal as an auxiliary pilot signal. Further scope provided herein.

In an implementation, the repeater 320 may comprise a detect circuit configured for detecting power of received signals, detecting changes in power of received signals, and/or adjusting amplification of received signals based on detected changes in power prior to transmitting the signals, for example, by providing a control signal to the amplifier 338. The detect circuit may also be configured for receiving either the echo-cancelled receive signal or the receive signal as an input signal and for processing the input signal to detect and identify any low power message signal that may be provided in the receive signal. The detected message signal, which may be referred to as a receive message signal, may be utilized by the repeater 320 to initiate appropriate or desired mitigation strategies. For instance, when the message signal is a low power spreading sequence, techniques familiar to those skilled in the art may be utilized to ensure detection of the low power spreading sequence embedded in the receive signal. The detect circuit of the repeater 300 may be deployed in a multi-repeater environment with other similarly constructed repeaters for facilitating inter-repeater communication. In some instances, the repeater 320 may transmit a message signal, and it may not be necessary for the repeater 320 to detect the message signal from other repeaters. In this instance, the detect circuit may be considered optional and thus omitted. However, the receiver circuit 332 may be configured to comprise the detect circuit or at least the functionality of the detect circuit.

In an implementation, the message signal may encode identification of the repeater 320, operational characteristics of the repeater 320, and/or various other useful information for use by the repeaters in a multi-repeater environment. In an example, the message signal may comprise a low power spreading sequence for identifying the repeater 320. In other examples, the message signal encodes information relating to the operational characteristics of the repeater 320. For example, the message signal may encode a gain level of the repeater 320, and/or the power level that the repeater 320 receives from other proximate repeaters. The message signal may be configured to encode a value for power amplifier headroom of the repeater 320. In some instances, providing power amplifier headroom information in the message signal provides advantages for communicating with an end-user wireless communication device to enable the end-user wireless communication device to transmit signals to the repeater 320 using the appropriate power level.

Figure 3B:
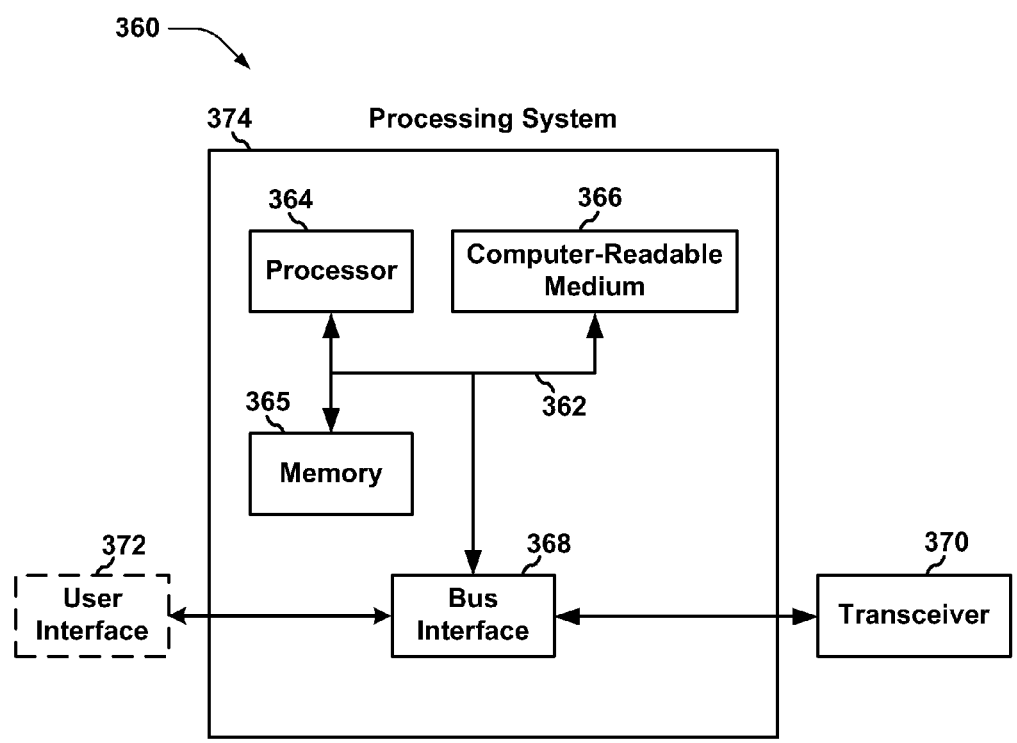
FIG. 3B shows a diagram illustrating an embodiment of a hardware implementation for an apparatus employing a processing system, in accordance with aspects of the disclosure.

FIG. 3B shows a diagram illustrating an embodiment of a hardware implementation for an apparatus 360 employing a processing system 374 having a memory 365, in accordance with aspects of the disclosure. The processing system 374 may comprise an analog device, a digital device, or an analog/digital device and may be implemented with a bus architecture, represented generally by a bus 362. The bus 362 may include any number of interconnecting buses and bridges depending on specific application of the processing system 374 and the design constraints. The bus 362 is configured to link together various circuits including one or more processors, represented generally by a processor 364, and computer-readable media, represented generally by a computer-readable medium 366. The bus 362 may link various other circuits, such as, for example, timing sources, peripherals, voltage regulators, and power management circuits, which are known in the art, and therefore, will not be described any further. A bus interface 368 provides an interface between the bus 362 and a transceiver 370, which may be referred to as a gain device. The transceiver 370 provides a means for communicating (including receiving and transmitting signals) with various other apparatus over a transmission medium. In an implementation, depending upon the nature of the apparatus 360, a user interface 372 (e.g., keypad, display, speaker, microphone, joystick) may be optionally provided.

In accordance with aspects of the disclosure, the processor 364 may be configured to manage the bus 362 and general processing, including the execution of software stored on memory 365 and/or on the computer-readable medium 366. The software, when executed by the processor 364, causes the processing system 374 to perform the various functions, processes, and/or algorithms described herein for any particular apparatus. The computer-readable medium 366 may also be utilized to store data that is manipulated by the processor 364 when executing software. The processor 364 may also be configured to control the transceiver 370 to provide analog and/or digital processing (including echo cancellation, signal filtering, received power determination, amplified signal transformation, addition of signals, etc.) and provide gain control for received and/or transmitted signals.

In accordance with aspects of the disclosure, the apparatus 360 may be configured to operate as a repeater, and the processing system 374 may be configured to perform operations relating to the repeater. As such, the apparatus 360 comprising the processing system 374 may be configured to implement aspects of the disclosure as provided herein.

According to aspects of the disclosure, repeaters may be deployed to resolve wireless coverage limitations. Generally, repeaters receive a weak incoming signal, amplify the received signal, and retransmit the amplified signal to an intended receiver. In a full duplex solution, the reception, amplification, and transmission may occur at the same time, except for processing and internal propagation delays or intentional small time offsets. In some instances, a problem may arise when the signal reception and transmission occurs on a same frequency, since the transmitted signal may also be received at the same time with the desired receive signal, thus creating interference. Although the created interference may be viewed as a replica of the desired signal, which may not necessarily be harmful to the intended receiver, but from the repeater operation's viewpoint, interference may create a positive feedback introducing stability problems.

In some circumstances, one technique of reducing interference is by subtracting the transmitted signal from the combined receive signal plus interference, which may be considered possible, since the transmitted signal is usually known to the repeater. This technique may be referred to as interference cancellation.

A possible problem may arise with this technique of interference cancellation in that while the transmitted signal is known, it undergoes certain changes, e.g., amplitude and phase changes, time delay, due to the propagation from the transmitter to the receiver of the repeater. This propagation path may be referred to as the feedback channel. To subtract the interference associated with the transmit signal properly, the feedback channel needs to be measured and estimated.

Since the transmitted signal is known, the feedback channel may be estimated by comparing the transmitted signal to its received replica. However, in this process, the received desired signal may serve as interference. Such interference may be mitigated by sufficient averaging as long as the channel probing signal (e.g., the transmitted signal) and interference are uncorrelated. In the case of a repeater, since the channel probing signal is a scaled and delayed version of the useful signal, this condition may not be satisfied whenever the desired signal has a delayed version due to a dispersive channel, that arrives approximately at the same time as the feedback from the transmitted signal. This type of interference may not be overcome by long averaging.

To mitigate this problem, an auxiliary pilot signal may be introduced and added to the transmitted signal. The auxiliary pilot signal may be generated so as to not be correlated to any of the other signals involved in the repeater operation. As such, uncorrelated signals may be subject to long averaging to improve the feedback channel estimation accuracy. In some situations, the auxiliary pilot signal may be transmitted towards the intended receiver and produce interference. However, as long as the relative power of the auxiliary pilot signal compared to the power of the total transmitted signal is low, the impact of such interference may be kept moderate.

In a constant channel bandwidth system, such as cdma2000 or WCDMA, the condition of maintaining a certain power ratio between the auxiliary pilot signal and the transmitted useful signal within the channel bandwidth may be easily maintained.

On the other hand, in an orthogonal frequency division multiplexing (OFDM) 1 system, such as the LTE DL or WiMAX DL and UL or in an single carrier frequency division multiplexing (SC-FDM) system, such as the LTE UL, the transmission bandwidth may not stay constant. In this case, the bandwidth of the auxiliary pilot signal should vary together with the desired signal to maintain a desirable power ratio limit on all frequencies. In some cases, transmitting the auxiliary pilot signal on a frequency not occupied by the desired signal may create an unacceptable level of interference to other unintended users.

Therefore, in accordance with aspects of the disclosure, there is a need to employ an auxiliary pilot signal for feedback channel estimation that has the following properties: the auxiliary pilot signal has approximately the same bandwidth as the signal being amplified, and the auxiliary pilot signal has a well controlled power ratio compared to the signal being amplified.

Since the signal being amplified by the repeater may have different power spectral densities in different sub-bands, due to, for example, being transmitted by different UEs in the case of the LTE UL, the auxiliary pilot signal should have a varying power spectral density as well to thereby follow the signal power spectral density with a controlled back-off. The above two requirements may be satisfied if the characteristics of the signal being amplified, in terms of bandwidth and/or a power spectrum profile is known to the repeater. Due to the simultaneous nature of the signal amplification, the feedback channel estimation, and the auxiliary pilot signal generation, the knowledge of the characteristics of the signal being amplified may not be assumed in general.

In accordance with aspects of the disclosure, an additional pilot signal (i.e., auxiliary pilot signal) may be added to the transmitted signal (i.e., amplified signal or repeated signal) to aid feedback channel estimation for the purposes of cancellation of self-interference in full duplex co-channel repeaters. Thus, aspects of the disclosure provide as auxiliary pilot signal comprising one or more properties as follows. The auxiliary pilot signal is known by the repeater. The auxiliary pilot signal has little or no time domain correlation with the signal being amplified. The auxiliary pilot signal has approximately the same bandwidth as the signal being amplified. In case the signal being amplified has variable power spectral density, and/or the signal being amplified has multiple possible non-contiguous bandwidth clusters, the power spectral density of the auxiliary pilot signal has a defined relationship to the power spectral density of the signal being amplified. For instance, the auxiliary pilot signal may have approximately the same power spectral density of the signal being amplified except for, in some circumstances, a linear scaling. As such, aspects of the disclosure provide for use of a transformed version of the signal to be amplified as an auxiliary pilot signal.

In an aspect of the disclosure, a technique may comprise providing a pre-notification of transmitted signal properties to the repeater. This pre-notification may be provided by the entity scheduling the transmitted signal, e.g., eNB, or from the entity actually transmitting the signal, e.g., UE (UL) or eNB (DL). However, providing pre-notification may be somewhat complex and result in a loss of network transparency for the repeater.

In another aspect of the disclosure, another technique may comprise generating the auxiliary pilot signal based on the signal being amplified with the challenge of having little or no time domain correlation between the auxiliary pilot signal and the signal being amplified.

In still another aspect of the disclosure, another preferred technique may comprise generating the auxiliary pilot signal by a frequency translation of the signal being amplified. In an implementation, when the frequency translation is by a multiple of the subcarrier frequency spacing in an OFDM or SC-FDM system (e.g., 15 kHz in LTE), the signals before and after the shift become substantially un-correlated in the time domain. In another implementation, as long as the frequency translation is by a small multiple of the subcarrier frequency spacing in an OFDM or SC-FDM system (e.g., 1×15 kHz in LTE), the signals before and after the shift occupy substantially the same bandwidth, even if the signal bandwidth comprises non-contiguous clusters. In still another implementation, if the signal being amplified has multiple possible non-contiguous bandwidth clusters, and/or if the signal being amplified has variable power spectral density, the power spectral density of the auxiliary pilot signal has a defined relationship to the power spectral density of the signal being amplified.

Aspects of the disclosure provide that the auxiliary pilot signal is known by the repeater. To satisfy this criterion, the following approach may be utilized. For instance, in the digital signal processing (DSP) domain, a branch for an auxiliary pilot signal may be created by taking the current signal to be transmitted at a certain stage. A frequency shift may be performed in the digital domain in the branch for the auxiliary pilot signal. For example, a frequency shift may be performed by shifting the tones before an inverse fast Fourier transform (IFFT) operation. In another example, a frequency shift may be performed by rotation of a constant rate signal after an IFFT operation. The generated auxiliary pilot signal samples may be stored. The signal to be transmitted may be summed with the auxiliary pilot signal samples in the digital domain, and the combined signal may be used for further transmit processing. The combined signal may be stored for later subtraction in the receiver, or the signal to be amplified may be stored separately. The stored auxiliary pilot signal may be used for feedback channel estimation in the receiver. The stored combined signal (or pilot signal and stored signal to be amplified) may be used for interference cancellation.

It should be appreciated that other implementations may be utilized to provide that the auxiliary pilot signal is known by the repeater. For instance, a time delay or time delay pattern may be applied to the signal to be amplified to generate the auxiliary pilot signal. However, this approach may suffer from signal correlation issues. In another instance, non-linear transformation may be utilized, such as a polynomial expression with odd harmonic terms. For example, the auxiliary pilot signal may be generated as a 3rd order intermodulation term $p(t)=c \cdot x^3(t)$, wherein a portion of the generated auxiliary pilot signal power would stay within the bandwidth of the signal amplified. However, this approach involves complicated processing, a significant portion of the power may leak into non-occupied bandwidth as intermodulation products, the power ratio of the auxiliary pilot signal and the signal to be amplified may not be constant and not well controlled in the case of non-uniform power spectral density profile, significant power occurring at the 3× harmonic frequency may need additional filtering. It should be appreciated that other transformations of the signal to be amplified to generate an auxiliary pilot signal are possible and meant to be covered by the disclosure.

It should be appreciated that there may be some circumstances where frequency shift may not create uncorrelated signals. These circumstances may need special handling. For example, space frequency block code (SFBC) solutions, such as used in the LTE DL, utilize joint pre-coding across consecutive (before tome mapping) symbols. This may create correlation on adjacent tones. To overcome any problems that may occur, a fixed auxiliary pilot signal in the DL may be used. This suffices since the DL bandwidth may be less variable compared to UL. Therefore, frequency shift may only be used in the UL in this case.

In another example, UL demodulation reference signals (DM-RS) use Chu-Zadoff sequences, which are time correlated with their frequency shift versions. To overcome any problems that may occur, the time periods corresponding to DM-RS symbols may be excluded from the auxiliary pilot signal generation. The preceding data symbols may be used for auxiliary pilot signal generation. Since pilot signal symbols may not be the first symbols in a given slot, this approach may be utilized in general. It should be appreciated that this approach may assume that the repeater has an approximate knowledge of UL system time.

In another example, physical uplink control channel (PUCCH) Format 1 and 2 uses Chu-Zadoff sequences for data, which are time correlated with their frequency shift versions. To overcome any problems that may occur, the auxiliary pilot signal may be periodically inverted, for example, at symbol boundaries. It should be appreciated that the inverted signal may undergo overlap-and-add operation to minimize emission problems. A periodic pattern may be used that does not match a PUCCH format 1 OCC (orthogonal cover code). For example, the reserved Format 1 OCC may be used in non-shortened PUCCH formats. See Note 1.

In another example, physical random access channel (PRACH) uses Chu-Zadoff sequences for data, which are time correlated with their frequency shift versions. To overcome any problems that may occur, a PRACH configuration that is most immune to this problem may be used in a manner similar to High Doppler PRACH configurations.

In another example, sounding reference signals (SRS) use Chu-Zadoff sequences, which are time correlated with their frequency shift versions. However, because of the frequency combination, the auxiliary pilot signal may interfere with another UEs SRS transmission. To overcome any problems that may occur, SRS symbols may be excluded from the auxiliary pilot signal generation. Since this may create problems when the UEs served by the repeater transmits SRS only, there may be reserved SRS resources in which repeaters may insert predetermined auxiliary pilot signals, independent of UE transmissions. See Note 2.

Note 1: In an example, assume three OCC's are occupied $w_1$, $w_2$, and $w_3$, and the fourth OCC $w_4$ is not occupied. Occupied OCCs may be utilized by multiple UEs. Then, the signal to be amplified is $s = c_1 \cdot w_1 + c_2 \cdot w_2 + c_3 \cdot w_3$.

Use $p = w_4 \cdot f(s)$ as auxiliary pilot signal, where f(s) represents the frequency shift operation. For feedback channel estimation, de-spread the signal by p*, i.e., the complex conjugate of p. For the intended receiver, the auxiliary pilot signal will be orthogonal, for example, $$\hat{s}_1 = \sum_l c_1^* \cdot w_1^* \cdot (p) = \sum_l c_1^* \cdot w_1^* \cdot w_4 \cdot f(s) = 0$$

where the summation is over the symbol index l and the summation limit corresponds to the OCC length.

Note 2: This approach may provide only limited feedback channel estimation SNR though but for the no transmission (other than SRS) case, this is the best SNR achievable.

The following discussion refers to Frequency Hopping. To utilize long integration to achieve the required feedback channel estimation accuracy, the signal bandwidth should be substantially stable. This condition may not hold in general in the LTE UL case. However, the eNB may take the following actions to improve the feedback channel estimation performance.

For example, the bandwidth allocated to dynamic acknowledgment (ACK) may be minimized. This may allow the repeater to use a previous estimate of the feedback channel in the dynamic ACK region irrespective of the PUCCH frequency hop, since the hopping may be confined in a narrow band and each channel edge. PUSCH frequency hopping should not be used for UEs that are connected through repeaters. Static PUSCH frequency allocation may be used for UEs that are connected through repeaters.

In accordance with aspects of the disclosure, the auxiliary pilot signal may be processed with time domain scrambling, wherein time domain scrambling sequence periods may coincide with symbol periods of the amplified signal. The time domain scrambling sequence may be orthogonal to at least one of the time domain scrambling sequences used in the amplified signal. In various implementations, the at least one of the time domain scrambling sequences used in the amplified signal may comprise an orthogonal cover used in at least one of PUCCH format 1, PUCCH format 1a, or PUCCH format 1b. In an implementation, the time domain scrambling sequence may comprise a sequence [+c+c−c−c], wherein c is a constant.

It should be appreciated that it may not be straightforward for the eNB to determine whether UEs are connected through repeaters. For instance, some UL repeater 'watermarking', i.e., intentional alteration of the forwarded signal, may be used for addressing this issue. Watermarking may include phase or frequency modulation of the amplified signal with a predetermined modulating signal pattern.

The following discussion refers to Pulse-shaping. It may be beneficial to use an auxiliary pilot signal that has small time domain sidelobes. This may be useful because the feedback channel itself may be dispersive. In this circumstance, distinguishing a delayed path from a signal sidelobe may be an additional issue. The smaller the sidelobe peaks are, the less problem could be expected.

Note that sidelobes may always be present for any signal that is band limited. For the same bandwidth limitation, however, the decay factor of the sidelobes may differ based on signal design (pulse-shaping).

A common solution for reducing sidelobe amplitudes is to use a pulse-shaping filter. For instance, a convenient application of a pulse-shaping filter is being part of an upsampling filter before the digital-to-analog (D/A) conversion. This approach may be applied directly to a deterministic auxiliary pilot signal. The auxiliary pilot signal may be passed through a separate upsampling filter stage, which may be designed for reduced sidelobe amplitudes, before adding or combining the pilot signal to the signal to be amplified.

The above approach may not work well with the frequency shift approach though, since the signal to be amplified, from which the auxiliary pilot signal is derived, may already comprise large sidelobes. To solve this problem, signal equalization may be used although this may represent large complexity increase and may be difficult to perform where signals from multiple sources (e.g., signals from multiple UEs) are present.

Note that even with sidelobes with significant amplitude, the feedback channel estimation may still be possible with good accuracy, since the sidelobes of the auxiliary pilot signal may be fully captured in the stored pilot signal. The feedback channel may be precisely observed with comparing the received signal to the exact replica of the transmit signal, even if the transmit signal has sidelobes with large amplitude. Therefore, the use of low sidelobe signals may comprise a non-essential optimization for reducing signal processing complexity.

Figure 4:
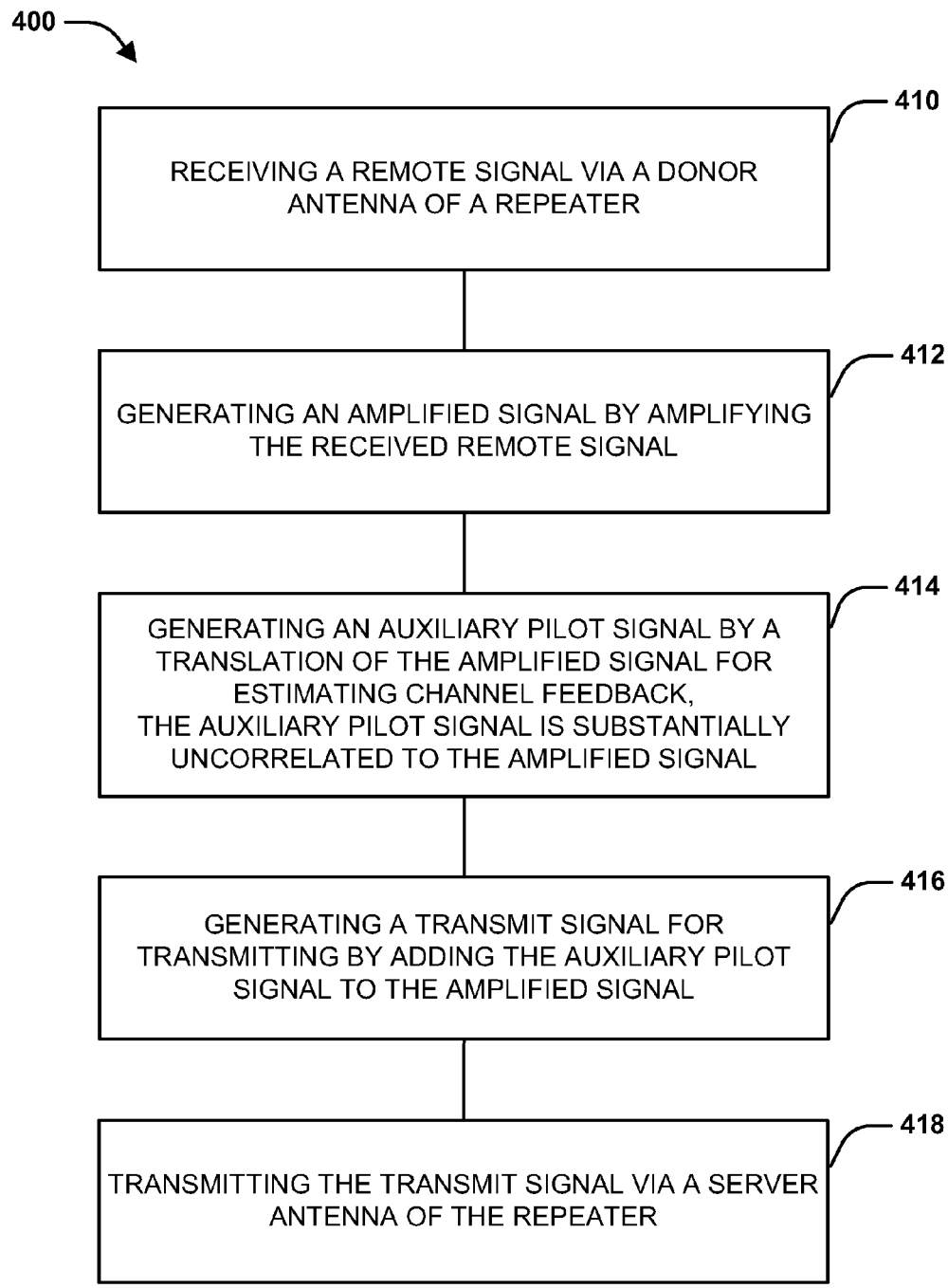
FIG. 4 shows a flow diagram illustrating a methodology for wireless communication, in accordance with aspects of the disclosure.

FIG. 4 shows a diagram illustrating a methodology 400 for facilitating wireless communication, in accordance with aspects of the disclosure. In reference to FIG. 4, the method may comprise, at 410, receiving a remote signal via a donor antenna of a repeater. At 412, the method may comprise generating an amplified signal by amplifying the received remote signal. At 414, the method may comprise generating an auxiliary pilot signal by a translation of the amplified signal for estimating channel feedback, wherein the auxiliary pilot signal is substantially uncorrelated to the amplified signal. At 416, the method may comprise generating a transmit signal for transmitting by combining the auxiliary pilot signal with the amplified signal. At 418, the method may comprise transmitting the transmit signal via a server antenna of the repeater.

In an implementation, referring to the method of FIG. 4, the translation may comprise a frequency translation of the amplified signal to generate the auxiliary pilot signal. The frequency translation may be generated by a multiple of the subcarrier frequency spacing in an OFDM system or an SC-FDM system, wherein the signals before and after the shift become substantially un-correlated in the time domain. The subcarrier frequency spacing may be within a range of approximately 5 kHz to 25 kHz. The subcarrier frequency spacing may be approximately 15 kHz. The translation may comprise a non-linear transformation of the amplified signal to generate the auxiliary pilot signal.

In an implementation, referring to FIG. 4, the method may further comprise receiving a replica of the transmitted signal via the donor antenna of the repeater, extracting the auxiliary pilot signal from the received replica of the transmitted signal in real time by frequency translation, and estimating channel feedback based on the extracted auxiliary pilot signal.

In various implementations, referring to the method of FIG. 4, the amplified signal and the auxiliary pilot signal may be generated with no time domain correlation. The amplified signal and the auxiliary pilot signal may be generated with similar bandwidths. The amplified signal and the auxiliary pilot signal may be generated with stable bandwidths. The generating with stable bandwidth operation may be in response to the generated signal being received through a repeater. The bandwidth of the auxiliary pilot signal may be generated to vary with the bandwidth of the amplified signal. The auxiliary pilot signal may be generated with a power spectral density that varies with the power spectral density of the amplified signal. The auxiliary pilot signal may be generated with small time domain sidelobes.

Figure 5:
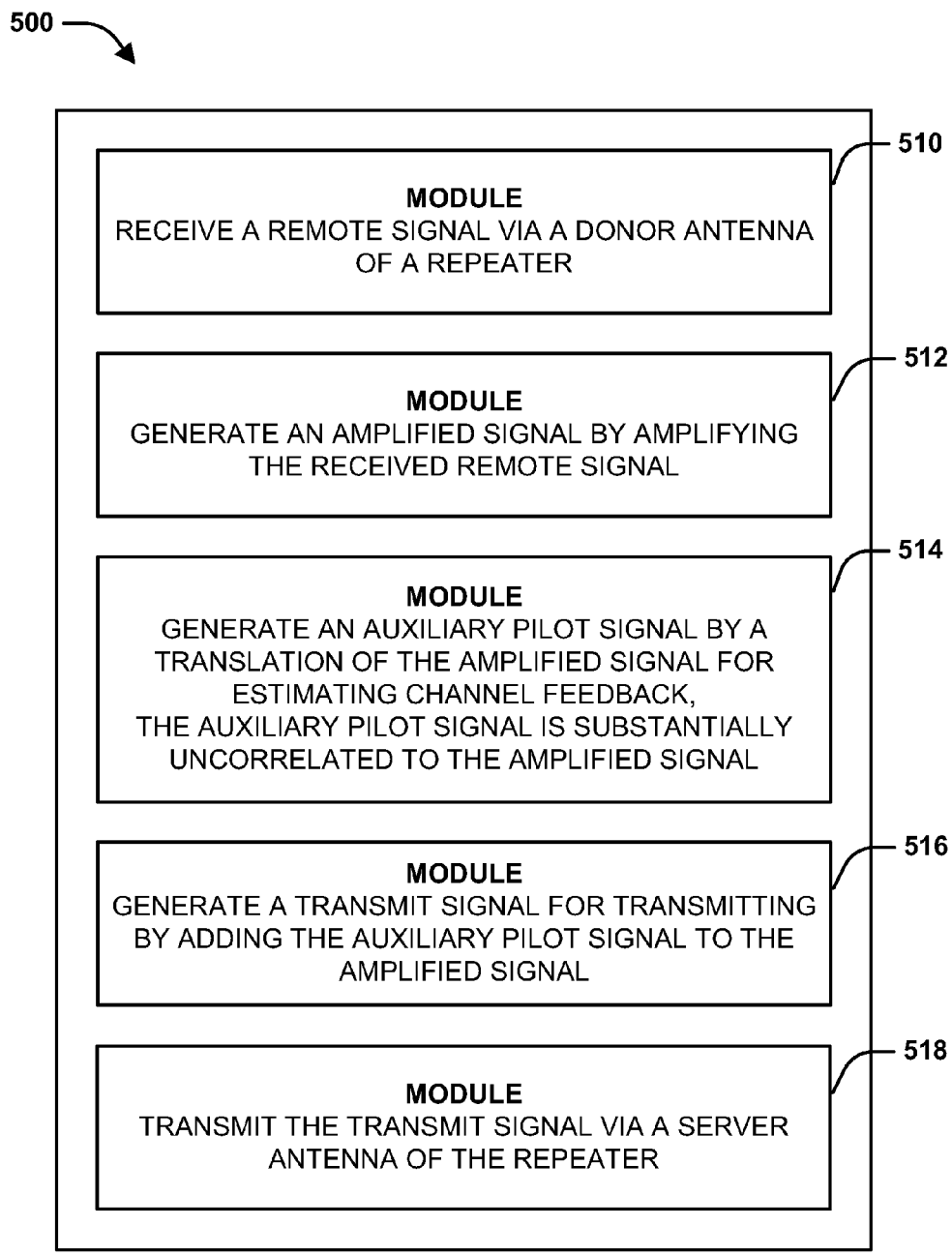
FIG. 5 shows a diagram illustrating the functionality of an apparatus, in accordance with aspects of the disclosure.

FIG. 5 shows a diagram illustrating the functionality of an apparatus 500, such as a repeater, configured to facilitate wireless communication, in accordance with aspects of the disclosure. The apparatus may include a module 510 configured to receive a remote signal via a donor antenna of a repeater. The apparatus may include a module 512 configured to generate an amplified signal by amplifying the received remote signal. The apparatus may include a module 514 configured to generate an auxiliary pilot signal by a translation of the amplified signal for estimating channel feedback, wherein the auxiliary pilot signal is substantially uncorrelated to the amplified signal. The apparatus may include a module 516 configured to generate a transmit signal for transmitting by combining the auxiliary pilot signal with the amplified signal. The apparatus may include a module 518 configured to transmit the transmit signal via a server antenna of the repeater. In various implementations, the apparatus may include additional modules that perform each of the steps in the aforementioned flow chart. As such, each step in the aforementioned flow chart may be performed by a module and the apparatus may include one or more of those modules.

In an implementation, referring to the apparatus of FIG. 5, the translation may comprise a frequency translation of the amplified signal to generate the auxiliary pilot signal. The frequency translation may be generated by a multiple of the subcarrier frequency spacing in an OFDM system or an SC-FDM system, wherein the signals before and after the shift become substantially un-correlated in the time domain. The subcarrier frequency spacing may be within a range of approximately 5 kHz to 25 kHz. The subcarrier frequency spacing may be approximately 15 kHz. The translation may comprise a non-linear transformation of the amplified signal to generate the auxiliary pilot signal.

In an implementation, referring to FIG. 5, the apparatus may further comprise a module configured to receive a replica of the transmitted signal via the donor antenna of the repeater, a module configured to extract the auxiliary pilot signal from the received replica of the transmitted signal in real time by frequency translation, and a module configured to estimate channel feedback based on the extracted auxiliary pilot signal.

In various implementations, referring to the apparatus of FIG. 5, the amplified signal and the auxiliary pilot signal may be generated with no time domain correlation. The amplified signal and the auxiliary pilot signal may be generated with similar bandwidths. The amplified signal and the auxiliary pilot signal may be generated with stable bandwidths. The generating with stable bandwidth operation may be in response to the generated signal being received through a repeater. The bandwidth of the auxiliary pilot signal may be generated to vary with the bandwidth of the amplified signal. The auxiliary pilot signal may be generated with a power spectral density that varies with the power spectral density of the amplified signal. The auxiliary pilot signal may be generated with small time domain sidelobes.

Referring to FIG. 3A, in a configuration, the apparatus for wireless communication comprises the repeater 320 providing means for receiving a remote signal via the donor antenna 330 of the repeater 320, means for generating an amplified signal by amplifying the received remote signal, means for generating an auxiliary pilot signal by a translation of the amplified signal for estimating channel feedback, wherein the auxiliary pilot signal is substantially uncorrelated to the amplified signal, and means for generating a transmit signal for transmitting by combining the auxiliary pilot signal with the amplified signal.

Referring to FIG. 3A, in an implementation, the apparatus for wireless communication may further comprise means for transmitting the transmit signal via the server antenna 340 of the repeater 320. In another implementation, the apparatus for wireless communication may further comprise means for receiving a replica of the transmitted signal via the donor antenna 330 of the repeater 320, means for extracting the auxiliary pilot signal from the received replica of the transmitted signal in real time by frequency translation, and means for estimating channel feedback based on the extracted auxiliary pilot signal.

Referring to FIG. 3B, in a configuration, the apparatus for wireless communication may comprise the repeater 360 comprising the processing system 374 configured to receive a remote signal via the transceiver 370 (e.g., donor antenna) of the repeater 360, generate an amplified signal by amplifying the received remote signal, generate an auxiliary pilot signal by a translation of the amplified signal for estimating channel feedback, wherein the auxiliary pilot signal is substantially uncorrelated to the amplified signal, and generate a transmit signal for transmitting by combining the auxiliary pilot signal with the amplified signal.

Referring to FIG. 3B, in an implementation, the processing system 374 may be further configured to transmit the transmit signal via the transceiver 370 (e.g., server antenna) of the repeater 360. In another implementation, the processing system 374 may be further configured to receive a replica of the transmitted signal via the transceiver 370 (e.g., donor antenna) of the repeater 360, extract the auxiliary pilot signal from the received replica of the transmitted signal in real time by frequency translation, and estimate channel feedback based on the extracted auxiliary pilot signal.

It will be appreciated that, in accordance with one or more aspects described herein, inferences may be made regarding or for performing the functions described herein. As utilized herein, the term to "infer" or "inference" refers generally to the process of reasoning about or inferring states of the system, environment, and/or user from a set of observations as captured via events and/or data. Inference may be employed to identify a specific context or action, or may generate a probability distribution over states, for example. The inference may be probabilistic—that is, the computation of a probability distribution over states of interest based on a consideration of data and events. Inference may also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is understood that the specific order or hierarchy of steps in the processes disclosed is an example of exemplary approaches. Based upon design preferences, it is understood that the specific order or hierarchy of steps in the processes may be rearranged while remaining within the scope of the disclosure. The accompanying method claims present elements of the various steps in a sample order, and are not meant to be limited to the specific order or hierarchy presented.

Those of skill in the art would understand that information and signals may be represented utilizing any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a UE. In the alternative, the processor and the storage medium may reside as discrete components in a UE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited utilizing the phrase "means for" or, in the case of a method claim, the element is recited utilizing the phrase "step for."

What is claimed is:

1. A method for wireless communication, comprising:
receiving a remote signal via a donor antenna of a repeater;
generating an amplified signal by amplifying the received remote signal;
generating an auxiliary pilot signal by a translation of the amplified signal for estimating channel feedback, wherein the auxiliary pilot signal is substantially uncorrelated to the amplified signal; and
generating a transmit signal for transmitting by combining the auxiliary pilot signal with the amplified signal.

2. The method of claim 1, wherein the translation comprises a frequency translation of the amplified signal to generate the auxiliary pilot signal.

3. The method of claim 2, wherein the frequency translation is generated by a multiple of a subcarrier frequency spacing in an orthogonal frequency division multiplexing (OFDM) system or a single carrier frequency division multiplexing (SC-FDM) system, wherein signals before and after a shift become substantially un-correlated in a time domain.

4. The method of claim 3, wherein the subcarrier frequency spacing is approximately 15 kHz.

5. The method of claim 1, wherein the translation comprises a non-linear transformation of the amplified signal to generate the auxiliary pilot signal.

6. The method of claim 1, further comprising transmitting the transmit signal via a server antenna of the repeater.

7. The method of claim 1, further comprising:
receiving a replica of the transmit signal via the donor antenna of the repeater;
extracting the auxiliary pilot signal from the received replica of the transmitted signal in real time by frequency translation; and
estimating channel feedback based on the extracted auxiliary pilot signal.

8. The method of claim 1, wherein the amplified signal and the auxiliary pilot signal are generated with no time domain correlation.

9. The method of claim 1, wherein the amplified signal and the auxiliary pilot signal are generated with similar bandwidths.

10. The method of claim 1, wherein the amplified signal and the auxiliary pilot signal are generated with stable bandwidths.

11. The method of claim 10, wherein the generating with stable bandwidths is in response to the generated signals being received through the repeater.

12. The method of claim 1, wherein a bandwidth of the auxiliary pilot signal is generated to vary with the bandwidth of the amplified signal.

13. The method of claim 1, wherein the auxiliary pilot signal is generated with a power spectral density that varies with the power spectral density of the amplified signal.

14. The method of claim 1, wherein the auxiliary pilot signal is generated with small time domain sidelobes.

15. The method of claim 1, further comprising processing the auxiliary pilot signal with time domain scrambling.

16. The method of claim 15, wherein periods of a sequence of the time domain scrambling coincide with symbol periods of the amplified signal.

17. The method of claim 16, wherein the time domain scrambling sequence is orthogonal to at least one of the time domain scrambling sequences used in the amplified signal.

18. The method of claim 17, wherein the at least one of the time domain scrambling sequences used in the amplified signal is an orthogonal cover used in at least one of PUCCH format 1, PUCCH format 1a, or PUCCH format 1b.

19. The method of claim 15, wherein the time domain scrambling comprises a sequence [+c+c−c−c], wherein c is a constant.

20. An apparatus for wireless communication, comprising:
a processing system configured to:
  receive a remote signal via a donor antenna of a repeater;
  generate an amplified signal by amplifying the received remote signal;
  generate an auxiliary pilot signal by a translation of the amplified signal for estimating channel feedback, wherein the auxiliary pilot signal is substantially uncorrelated to the amplified signal; and
  generate a transmit signal for transmitting by combining the auxiliary pilot signal with the amplified signal.

21. The apparatus of claim 20, wherein the translation comprises a frequency translation of the amplified signal to generate the auxiliary pilot signal.

22. The apparatus of claim 21, wherein the frequency translation is generated by a multiple of a subcarrier frequency spacing in an orthogonal frequency division multiplexing (OFDM) system or a single carrier frequency division multiplexing (SC-FDM) system, wherein signals before and after a shift become substantially un-correlated in a time domain.

23. The apparatus of claim 22, wherein the subcarrier frequency spacing is approximately 15 kHz.

24. The apparatus of claim 20, wherein the translation comprises a non-linear transformation of the amplified signal to generate the auxiliary pilot signal.

25. The apparatus of claim 20, wherein the processing system is further configured to transmit the transmit signal via a server antenna of the repeater.

26. The apparatus of claim 20, wherein the processing system is further configured to:
  receive a replica of the transmit signal via the donor antenna of the repeater;
  extract the auxiliary pilot signal from the received replica of the transmitted signal in real time by frequency translation; and
  estimate channel feedback based on the extracted auxiliary pilot signal.

27. The apparatus of claim 20, wherein the amplified signal and the auxiliary pilot signal are generated with no time domain correlation.

28. The apparatus of claim 20, wherein the amplified signal and the auxiliary pilot signal are generated with similar bandwidths.

29. The apparatus of claim 20, wherein the amplified signal and the auxiliary pilot signal are generated with stable bandwidths.

30. The apparatus of claim 29, wherein the generating with stable bandwidths is in response to the generated signal being received through the repeater.

31. The apparatus of claim 20, wherein a bandwidth of the auxiliary pilot signal is generated to vary with the bandwidth of the amplified signal.

32. The apparatus of claim 20, wherein the auxiliary pilot signal is generated with a power spectral density that varies with the power spectral density of the amplified signal.

33. The apparatus of claim 20, wherein the auxiliary pilot signal is generated with small time domain sidelobes.

34. The apparatus of claim 20, wherein the processing system is further configured to process the auxiliary pilot signal with time domain scrambling.

35. The apparatus of claim 34, wherein periods of a sequence of the time domain scrambling coincide with symbol periods of the amplified signal.

36. The apparatus of claim 35, wherein the time domain scrambling sequence is orthogonal to at least one of the time domain scrambling sequences used in the amplified signal.

37. The apparatus of claim 36, wherein the at least one of the time domain scrambling sequences used in the amplified signal is an orthogonal cover used in at least one of PUCCH format 1, PUCCH format 1a, or PUCCH format 1b.

38. The apparatus of claim 34, wherein the time domain scrambling comprises a sequence [+c+c−c−c], wherein c is a constant.

39. An apparatus for wireless communication, comprising:
  means for receiving a remote signal via a donor antenna of a repeater;
  means for generating an amplified signal by amplifying the received remote signal;
  means for generating an auxiliary pilot signal by a translation of the amplified signal for estimating channel feedback, wherein the auxiliary pilot signal is substantially uncorrelated to the amplified signal; and
  means for generating a transmit signal for transmitting by combining the auxiliary pilot signal with the amplified signal.

40. The apparatus of claim 39, wherein the translation comprises a frequency translation of the amplified signal to generate the auxiliary pilot signal.

41. The apparatus of claim 40, wherein the frequency translation is generated by a multiple of a subcarrier frequency spacing in an orthogonal frequency division multiplexing (OFDM) system or a single carrier frequency division multiplexing (SC-FDM) system, wherein signals before and after a shift become substantially un-correlated in a time domain.

42. The apparatus of claim 41, wherein the subcarrier frequency spacing is approximately 15 kHz.

43. The apparatus of claim 39, wherein the translation comprises a non-linear transformation of the amplified signal to generate the auxiliary pilot signal.

44. The apparatus of claim 39, further comprising means for transmitting the transmit signal via a server antenna of the repeater.

45. The apparatus of claim 39, further comprising:
  means for receiving a replica of the transmit signal via the donor antenna of the repeater;
  means for extracting the auxiliary pilot signal from the received replica of the transmitted signal in real time by frequency translation; and
  means for estimating channel feedback based on the extracted auxiliary pilot signal.

46. The apparatus of claim 39, wherein the amplified signal and the auxiliary pilot signal are generated with no time domain correlation.

47. The apparatus of claim 39, wherein the amplified signal and the auxiliary pilot signal are generated with similar bandwidths.

48. The apparatus of claim 39, wherein the amplified signal and the auxiliary pilot signal are generated with stable bandwidths.

49. The apparatus of claim 48, wherein the generating with stable bandwidths is in response to the generated signals being received through the repeater.

50. The apparatus of claim 39, wherein a bandwidth of the auxiliary pilot signal is generated to vary with the bandwidth of the amplified signal.

51. The apparatus of claim 39, wherein the auxiliary pilot signal is generated with a power spectral density that varies with the power spectral density of the amplified signal.

52. The apparatus of claim 39, wherein the auxiliary pilot signal is generated with small time domain sidelobes.

53. The apparatus of claim 39, further comprising means for processing the auxiliary pilot signal with time domain scrambling.

54. The apparatus of claim 53, wherein periods of a sequence of the time domain scrambling coincide with symbol periods of the amplified signal.

55. The apparatus of claim 54, wherein the time domain scrambling sequence is orthogonal to at least one of the time domain scrambling sequences used in the amplified signal.

56. The apparatus of claim 55, wherein the at least one of the time domain scrambling sequences used in the amplified signal is an orthogonal cover used in at least one of PUCCH format 1, PUCCH format 1a, or PUCCH format 1b.

57. The apparatus of claim 53, wherein the time domain scrambling comprises a sequence [+c+c−c−c], wherein c is a constant.

58. A non-transitory computer-readable medium comprising codes executable to cause an apparatus to:
receive a remote signal via a donor antenna of a repeater;
generate an amplified signal by amplifying the received remote signal;
generate an auxiliary pilot signal by a translation of the amplified signal for estimating channel feedback, wherein the auxiliary pilot signal is substantially uncorrelated to the amplified signal; and
generate a transmit signal for transmitting by combining the auxiliary pilot signal with the amplified signal.

59. The non-transitory computer-readable medium of claim 58, wherein the translation comprises a frequency translation of the amplified signal to generate the auxiliary pilot signal.

60. The non-transitory computer-readable medium of claim 59, wherein the frequency translation is generated by a multiple of a subcarrier frequency spacing in an orthogonal frequency division multiplexing (OFDM) system or a single carrier frequency division multiplexing (SC-FDM) system, wherein signals before and after a shift become substantially un-correlated in a time domain.

61. The non-transitory computer-readable medium of claim 60, wherein the subcarrier frequency spacing is approximately 15 kHz.

62. The non-transitory computer-readable medium of claim 58, wherein the translation comprises a non-linear transformation of the amplified signal to generate the auxiliary pilot signal.

63. The non-transitory computer-readable medium of claim 58, further comprising codes executable to cause the apparatus to transmit the transmit signal via a server antenna of the repeater.

64. The non-transitory computer-readable medium of claim 58, further comprising codes executable to cause the apparatus to:
receive a replica of the transmit signal via the donor antenna of the repeater;
extract the auxiliary pilot signal from the received replica of the transmitted signal in real time by frequency translation; and
estimate channel feedback based on the extracted auxiliary pilot signal.

65. The non-transitory computer-readable medium of claim 58, wherein the amplified signal and the auxiliary pilot signal are generated with no time domain correlation.

66. The non-transitory computer-readable medium of claim 58, wherein the amplified signal and the auxiliary pilot signal are generated with similar bandwidths.

67. The non-transitory computer-readable medium of claim 58, wherein the amplified signal and the auxiliary pilot signal are generated with stable bandwidths.

68. The non-transitory computer-readable medium of claim 67, wherein the generating with stable bandwidths is in response to the generated signals being received through the repeater.

69. The non-transitory computer-readable medium of claim 58, wherein a bandwidth of the auxiliary pilot signal is generated to vary with the bandwidth of the amplified signal.

70. The non-transitory computer-readable medium of claim 58, wherein the auxiliary pilot signal is generated with a power spectral density that varies with the power spectral density of the amplified signal.

71. The non-transitory computer-readable medium of claim 58, wherein the auxiliary pilot signal is generated with small time domain sidelobes.

72. The non-transitory computer-readable medium of claim 58, further comprising codes executable to cause the apparatus to process the auxiliary pilot signal with time domain scrambling.

73. The non-transitory computer-readable medium of claim 72, wherein periods of a sequence of the time domain scrambling coincide with symbol periods of the amplified signal.

74. The non-transitory computer-readable medium of claim 73, wherein the time domain scrambling sequence is orthogonal to at least one of the time domain scrambling sequences used in the amplified signal.

75. The non-transitory computer-readable medium of claim 74, wherein the at least one of the time domain scrambling sequences used in the amplified signal is an orthogonal cover used in at least one of PUCCH format 1, PUCCH format 1a, or PUCCH format 1b.

76. The non-transitory computer-readable medium of claim 72, wherein the time domain scrambling comprises a sequence [+c+c−c−c], wherein c is a constant.

* * * * *